(12) United States Patent
Dobranski

(10) Patent No.: US 6,695,127 B1
(45) Date of Patent: Feb. 24, 2004

(54) BUCKET FOR A BUCKET ELEVATOR

(76) Inventor: Miles Dobranski, 145 Henderson Drive, Regina, Saskatchewan S4N 5W4 (CA)

( * ) Notice: Subject to any disclaimer, the term of this patent is extended or adjusted under 35 U.S.C. 154(b) by 0 days.

(21) Appl. No.: 10/394,237

(22) Filed: Mar. 24, 2003

(51) Int. Cl.[7] .............................................. B65G 17/36
(52) U.S. Cl. ...................................... 198/711; 713/714
(58) Field of Search ................................ 198/708, 711, 198/713, 714

(56) References Cited

U.S. PATENT DOCUMENTS

| 352,077 A | 11/1886 | Avery | 198/711 |
|---|---|---|---|
| 746,486 A | 12/1903 | Flock | 198/711 |
| 4,770,288 A | 9/1988 | Kruger | 198/711 |
| 5,143,203 A * | 9/1992 | Hinner | 198/711 X |

FOREIGN PATENT DOCUMENTS

DE 1120365 * 12/1961 ................ 198/711

* cited by examiner

Primary Examiner—James R. Bidwell
(74) Attorney, Agent, or Firm—Ryan W. Dupuis; Adrian D. Battison; Michael R. Williams

(57) ABSTRACT

A bucket is provided for a bucket elevator of the type including a plurality of buckets supported on an endless belt. Each bucket is in the form of a container having an open top end which includes a plurality of spacer elements molded integrally on the back wall thereof. The spacer elements provide spacing between the back wall of the bucket and the belt upon which it is supported for preventing particulate material being conveyed by the elevator from being trapped between the bucket and the belt.

14 Claims, 2 Drawing Sheets

BUCKET FOR A BUCKET ELEVATOR

FIELD OF THE INVENTION

The present invention relates to a bucket elevator and more particularly to the design of a bucket for use on a bucket elevator.

BACKGROUND

Bucket type elevators or conveyors are known for various applications, in particular for elevating particulate materials from one location to another. The general construction of a bucket elevator includes an endless belt rotatably supported about a series of pulleys so that the belt includes straight sections extending between the pulleys and curved sections wrapping about the pulleys at any given time. Typical buckets supported on these types of elevators generally comprise a container having an open top end and a flat back wall supported directly adjacent the belt. As the belt is rotated from the curved sections to the straight sections, varying amounts of the back wall of each bucket comes into contact with the belt causing the material being conveyed to be caught therebetween causing contamination when different materials are later conveyed or cause the materials to be crushed or otherwise degraded.

U.S. Pat. No. 4,770,288 to Kruger, U.S. Pat. No. 352,077 to Avery and U.S. Pat. No. 746,486 to Flock disclose variations to elevator buckets, but none provide a satisfactory solution to preventing materials from being trapped between the back wall of the buckets and the belt in a simple and cost effective construction. Kruger requires a complex construction including pivots which require maintenance, while Avery discloses a complex mounting configuration resulting in a shelf being produced between the bucket and the belt which readily traps material thereon causing contamination. Flock requires that the back wall of the bucket itself be formed to space the bucket from the belt, however in this configuration the resulting channels formed readily trap material at the edges thereof between the bucket and the belt as channels formed within the bucket itself do not provide sufficient space between the bucket and the belt.

SUMMARY

According to one aspect of the invention there is provided a bucket for a bucket elevator including an endless belt for supporting the bucket thereon, the bucket comprising:

a back wall, a front wall spaced from the back wall, a bottom joining the front and back wall at a bottom side of the bucket and a pair of side walls extending between the front and back wall at spaced positions to form a container having an open top end;

a plurality of spacer elements protruding from the back wall, the back wall including a plurality of mounting apertures in alignment with and extending through respective spacer elements for receiving fasteners to mount the bucket on the belt.

According to a second aspect of the present invention there is provided a bucket elevator comprising an endless belt rotatably supported on a support frame, the belt having a plurality of mounting apertures therein for supporting a plurality of buckets on the belt, each bucket comprising:

a back wall, a front wall spaced from the back wall, a bottom joining the front and back wall at a bottom side of the bucket and a pair of side walls extending between the front and back wall at spaced positions to form a container having an open top end; and a plurality of spacer elements protruding from the back wall;

the back wall including a plurality of mounting apertures in alignment with and extending through respective spacer elements;

a plurality of fasteners being received through respective mounting apertures in the spacer elements of each bucket and the belt to mount the bucket on the belt.

The use of spacers projecting from the back wall and which include mounting apertures through the spacer elements and the back wall itself provides a bucket of simple construction which is readily installed using common fasteners while providing sufficient spacing between the bucket and the belt. The configuration of the spacer elements readily permits the buckets to be integrally moulded to further simplify construction thereof.

The spacer elements may be integrally formed on the back wall of the respective bucket and are preferably integrally molded with the walls of the bucket out of plastic material.

The plurality of spacer elements preferably includes spacer elements which are spaced both vertically and horizontally from one another on the respective bucket.

The plurality of mounting apertures are preferably only located in spacer elements adjacent the open top end of each bucket to permit the lower spacer elements to be freely displaced away from the belt and release particulate material which may be trapped therebetween.

In one embodiment, the spacer elements may comprise a circular disc such that each spacer element includes a sloped upper surface which is generally convex.

The spacer elements may also be tapered so as to be reduced in cross sectional in a longitudinal direction projecting outwardly from the back wall of the respective bucket.

BRIEF DESCRIPTION OF THE DRAWINGS

In the accompanying drawings, which illustrate an exemplary embodiment of the present invention.

DETAILED DESCRIPTION

Figure 1:
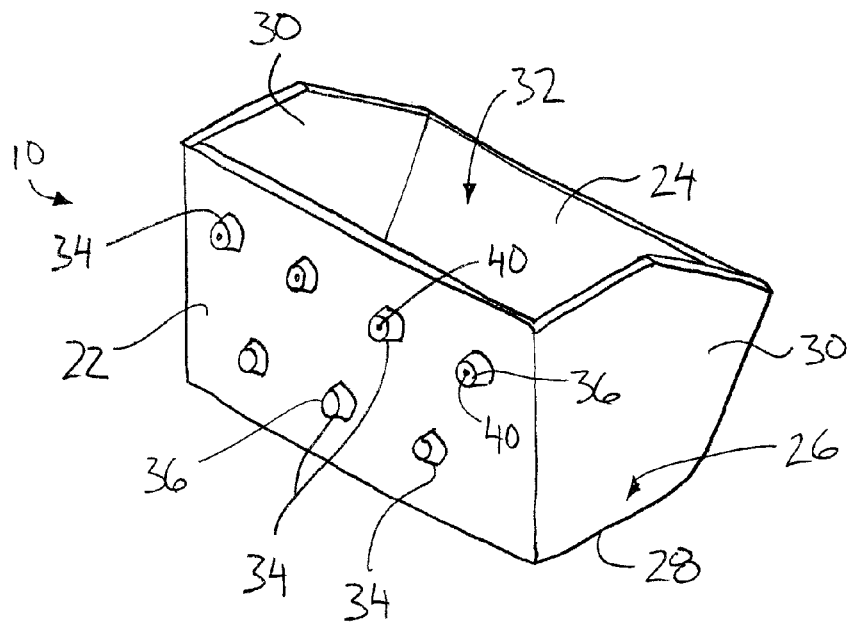
FIG. 1 is a perspective rear view of a bucket shown separated from the belt of the bucket elevator.
Figure 4:
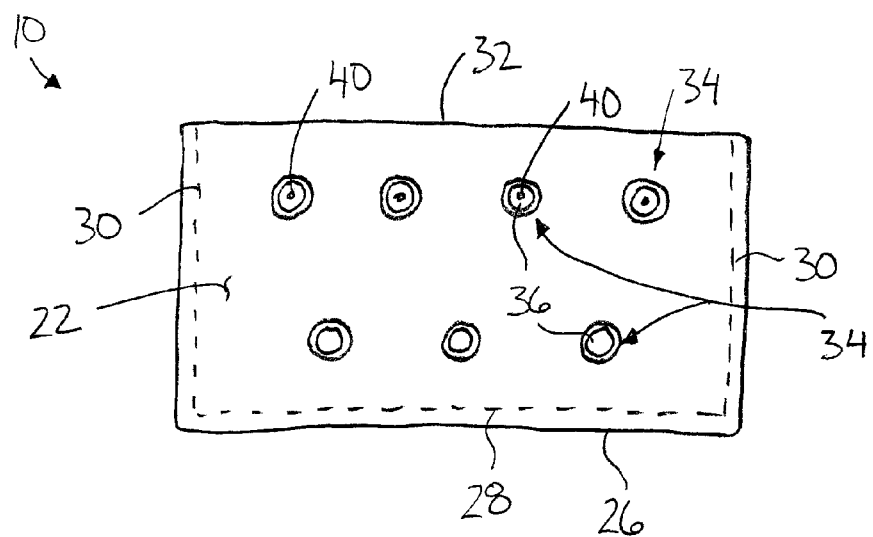
FIG. 4 is a rear elevational view of a bucket shown separated from the belt.

Referring to the accompanying figures, there is illustrated a bucket generally indicated by reference numeral 10. The bucket 10 is particularly suited for use on a bucket elevator 12 of the type which includes an endless belt 14 supported for rotation.

The elevator 12 generally includes a plurality of pulleys 16 which support the endless belt 14 rotatably thereon. The belt comprises a generally broad flat surface for mounting a plurality of the buckets 10 thereon. In use the belt includes straight portions 18 in which the belt extends flat and straight between spaced apart pulleys 16 and curved portions 20 in which the belt wraps around one of the pulleys 16. The belt is continuously in transition from straight portions to curved portions as the belt is rotated about the pulleys of the support frame of the bucket elevator 12.

Each bucket 10 generally includes a flat rear wall 22 and a sloped front wall 24 spaced outwardly therefrom. The front and rear walls are joined at a bottom end 26 of the bucket by a bottom wall 28. A pair of side walls 30 are spaced apart and parallel to one another to extend between opposing side edges of the front and rear walls of the bucket so as to define a container having an open top end 32 and a closed bottom end 26. All of the walls of the bucket are integrally moulded with one another of a durable plastic material.

The bucket further includes a plurality of spacer elements 34 integrally moulded with the walls of the bucket on the rear wall 22 thereof. Each spacer element 34 generally comprises a frustoconical shaped projection which extends rearwardly and outwardly from the rear wall 22 away from the bucket in a longitudinal direction. Accordingly, the spacer elements are each generally circular in cross section and are oriented to be tapered in the longitudinal direction so as to be narrowest at the free end 36 thereof. Each spacer element 34 thus has a curved outer surface which is convex at an upper side thereof while being sloped downwardly and outwardly away from the rear wall so that no shelf results as the curved outer surface acts to shed particulate material from the spacer element.

The spacer elements 34 are spaced vertically from one another in two horizontal rows extending across the rear wall 22 of the bucket. Within each row the spacer elements are spaced horizontally from one another. All of the spacer elements have an equal depth between the free end 36 thereof and the back wall so as to support the back wall at an equal distance from the belt, in a generally parallel configuration.

Spacer elements located adjacent the open top end of the bucket forming the upper row of the spacer elements, positioned in an upper half of the rear wall 22, include respective mounting apertures 40 extending therethrough in the longitudinal direction. The spacer elements project from the rear wall so that the mounting apertures 40 are concentric with the respective spacer elements. The mounting apertures 40 extend fully through the rear wall 22 of the bucket and the respective spacer elements for receiving a fastener therethrough for mounting in alignment with respective mounting apertures 42 located in the belt of the elevator. Any suitable form of threaded fastener and the like may be used for fastening the bucket to the belt.

Figure 2:
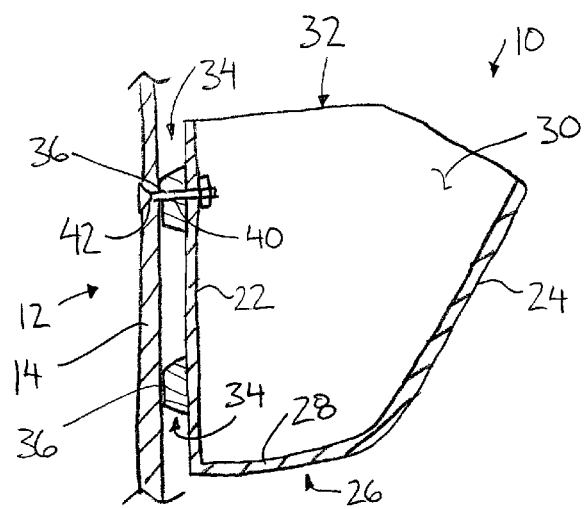
FIG. 2 is a sectional view of a bucket shown supported on the belt.
Figure 3:
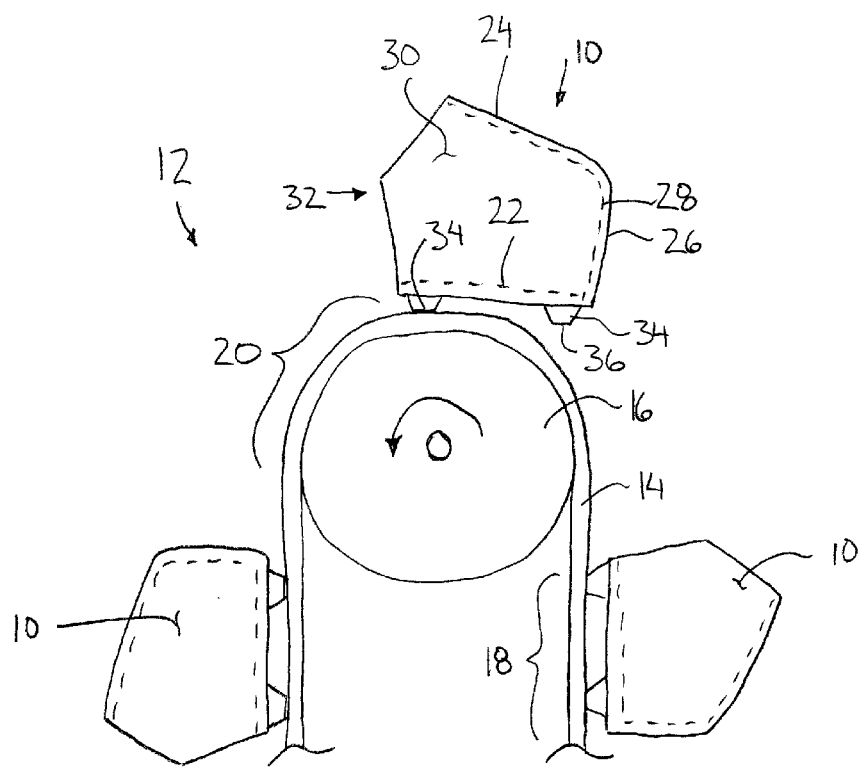
FIG. 3 is a side elevational view illustrating plural buckets shown mounted on a belt shown flexed about a pulley supporting the belt thereon.

The remaining spacer elements 34 in the lower row, in a lower half of the bucket rear wall, do not include apertures therein, and accordingly are arranged to rest freely against the belt without being secured thereto by fasteners. In this configuration, the buckets are deflected between the straight position as shown in FIG. 2 in which all of the spacer elements are engaged with the belt and the rear wall 22 of the bucket is aligned parallel to the flat section of the belt, and a curved position as shown at the top of FIG. 3 in which the lower most spacer elements are freely deflected away from the belt which is curved about one of the pulleys of the elevator.

The small tapered mounting surface of the spacer elements which surrounds the mounting aperture at the free end thereof ensures that the mounting surface at the free end of the spacer elements is held tightly against the belt to prevent any material from being caught therebetween. The remaining spacer elements which are not mounted and do not include mounting apertures are spaced sufficiently below the upper row of spacer elements and are located near enough to the bottom of the bucket that these spacer elements adjacent the bottom of the bucket are ensured to be displaced away from the belt to release any material potentially caught therebetween.

In further embodiments of the present invention, the spacer elements may be formed separately from the bucket and later secured onto the bucket by any suitable fastening means. In this instance, the spacer elements would also preferably include sloped rounded outer surfaces to prevent collection of materials thereon. Sufficient vertical and horizontal spacing between adjacent spacer elements is also desirable for preventing collection of material between the bucket and the belt.

As noted above, the cup or bucket of the bucket elevator described generally has the form of a conventional bucket elevator cup with the exception of extrusions formed on the rear wall which create a desirable spacing of the bucket from the belt to which it is attached.

Adjacent a top side, the back wall of the bucket is extruded outwards in three or four separate places at horizontally spaced positions depending upon the size of the bucket and the particular application. These extrusions are evenly spaced along the rear of the bucket and extend from the bucket a distance sufficient for product, for example field peas, to fall between the belt and the back of the cup. These upper extrusions are circular and tapered, while being slightly larger in circumference than the head of bolts used to connect the bucket to the belt. The circular and tapered formation of each of the upper extrusions or spacer elements, will ensure that there is no shelf on which product can sit or accumulate.

For carrying maximum capacity, two or three lower extrusions or spacer elements are also added to the back of the bucket to further act as spacers alone and do not assist in mounting the bucket to the belt. These lower extrusions are also circular and tapered to extend outwardly from the rear wall of the cup at horizontally spaced positions so that these spacer elements touch the belt at the same distance that the upper extrusions or spacer elements do. Accordingly the spacer elements combined hold the bucket away from the belt an even distance so that product is allowed to flow straight through between the rear wall of the bucket and the belt. As the lowermost spacer elements are not attached to the belt in any way, they simply act as supports for the bucket while permitting any material potentially trapped therebetween to be released when the belt is flexed about a pulley of the elevator.

While various embodiments of the present invention have been described in the foregoing, it is to be understood that other embodiments are possible within the scope of the invention. The invention is to be considered limited solely by the scope of the appended claims.

What is claimed is:

1. A bucket for a bucket elevator including an endless belt for supporting the bucket thereon, the bucket comprising:

a back wall, a front wall spaced from the back wall, a bottom joining the front and back wall at a bottom and of the bucket and a pair of side walls extending between the front and back wall at spaced positions to form a container having an open top end;

a plurality of spacer elements protruding from the back wall, the back wall including a plurality of mounting apertures in alignment with and extending through respective spacer elements for receiving fasteners to mount the bucket on the belt;

the spacer elements being tapered so as to be reduced in cross-section in a longitudinal direction projecting outwardly from the back wall of the bucket.

2. The bucket according to claim 1 wherein the spacer elements are integrally formed on the back wall of the bucket.

3. The bucket according to claim 1 wherein the spacer elements and the walls of the bucket are integrally molded with one another out of plastic material.

4. The bucket according to claim 1 wherein the plurality of spacer elements includes spacer elements which are spaced horizontally from one another between the side walls of the bucket.

5. The bucket according to claim 1 wherein the plurality of spacer elements includes spacer elements which are spaced vertically from one another between the top and bottom ends of the bucket.

6. The bucket according to claim 1 wherein the plurality of spacer elements includes spacer elements which are spaced both vertically and horizontally from one another.

7. A bucket for a bucket elevator including an endless belt for supporting the bucket thereon, the bucket comprising:

a back wall, a front wall spaced from the back wall, a bottom joining the front and back wall at a bottom end of the bucket and a pair of side walls extending between the front and back wall at spaced positions to form a container having an open top end;

a plurality of spacer elements protruding from the back wall, the back wall including a plurality of mounting apertures in alignment with and extending through respective spacer elements for receiving fasteners to mount the bucket on the belt;

the spacer elements including spacer elements which are spaced both vertically and horizontally from one another and which are molded integrally of plastic material with the walls.

8. The bucket according to claim 7 wherein the plurality of mounting apertures are only located in spacer elements adjacent the open top end of the bucket.

9. The bucket according to claim 7 wherein each spacer element includes a sloped upper surface.

10. The bucket according to claim 9 wherein the upper surface is convex.

11. A bucket in combination with a bucket elevator comprising an endless belt rotatably supported on a support frame, the belt having a plurality of mounting apertures therein for supporting the bucket on the belt, the bucket comprising:

a back wall, a front wall spaced from the back wall, a bottom joining the front and back wall at a bottom side of the bucket and a pair of side walls extending between the front and back wall at spaced positions to form a container having an open top end; and a plurality of spacer elements protruding from the back wall, the spacer elements including spacer elements which are spaced both vertically and horizontally from one another and which are molded integrally of plastic material with the walls;

the back wall including a plurality of mounting apertures in alignment with and extending through respective spacer elements, the mounting apertures being only located in spacer elements adjacent the open top end of the bucket;

a plurality of fasteners being received through respective mounting apertures in the spacer elements of the bucket and the belt to mount the bucket on the belt.

12. The bucket according to claim 11 wherein each spacer element includes a sloped upper surface.

13. The bucket according to claim 12 wherein the upper surface is convex.

14. The bucket according to claim 11 wherein the spacer elements are tapered so as to be reduced in cross-section in a longitudinal direction projecting outwardly from the back wall of the respective bucket.

\* \* \* \* \*